(12) United States Patent
Reichenwallner et al.

(10) Patent No.: US 12,494,072 B2
(45) Date of Patent: Dec. 9, 2025

(54) MATURITY CLASSIFICATION OF STAINED RETICULOCYTES USING OPTICAL MICROSCOPY

(71) Applicant: Siemens Healthcare GmbH, Erlangen (DE)

(72) Inventors: Ann-Kathrin Reichenwallner, Au bei Bad Feilnbach (DE); Lukas Richter, Hirschaid (DE)

(73) Assignee: Siemens Healthineers AG, Erlangen (DE)

( * ) Notice: Subject to any disclaimer, the term of this patent is extended or adjusted under 35 U.S.C. 154(b) by 1089 days.

(21) Appl. No.: 17/489,736

(22) Filed: Sep. 29, 2021

(65) Prior Publication Data

US 2022/0108099 A1 Apr. 7, 2022

(30) Foreign Application Priority Data

Oct. 1, 2020 (EP) .................................... 20199526

(51) Int. Cl.
*G06V 20/69* (2022.01)
*G01N 1/30* (2006.01)
(Continued)

(52) U.S. Cl.
CPC .............. *G06V 20/698* (2022.01); *G01N 1/30* (2013.01); *G01N 1/312* (2013.01);
(Continued)

(58) Field of Classification Search
CPC ...... G01N 1/30; G01N 1/312; G01N 15/1433; G01N 2001/302; G01N 2015/014;
(Continued)

(56) References Cited

U.S. PATENT DOCUMENTS 10,843,190 B2 * 11/2020 Bachelet ............ G01N 15/1433
2009/0213214 A1 8/2009 Yamada
(Continued)

FOREIGN PATENT DOCUMENTS

CN 111602046 A * 8/2020 ............... G01N 1/30
JP S5352198 A 5/1978
(Continued)

OTHER PUBLICATIONS

Piva, E. et al; "Clinical Utility of Reticulocyte Parameters"; Clin Lab Med 35 (2015) 133-163.
(Continued)

*Primary Examiner* — Jennifer Wecker
(74) *Attorney, Agent, or Firm* — Dugan & Dugan, PC

(57) ABSTRACT

The present invention relates to a method of maturity classifying reticulocytes from a whole blood sample, comprising: staining the sample with a supravital agglutinating dyeing reagent or a fluorescent agglutinating dye; illuminating the stained sample with a light beam to detect reticulocytes; determining for each reticulocyte the parameters of (i) a fraction (Λ) of the reticulum area (Ar) to the whole cell area (Ac); and (ii) a fraction (Γ) of the perimeter of the reticulum (Ur) to the reticulum area (Ar); and maturity classifying a reticulocyte into 1 of 4 major maturity classes according to the values determined for Λ and Γ.

16 Claims, 3 Drawing Sheets

(51) Int. Cl.
*G01N 1/31* (2006.01)
*G01N 21/64* (2006.01)
*G01N 33/50* (2006.01)
*G06V 10/00* (2022.01)
*G06V 10/70* (2022.01)
*G06V 10/88* (2022.01)

(52) U.S. Cl.
CPC ..... *G01N 21/6428* (2013.01); *G01N 21/6458* (2013.01); *G01N 33/5005* (2013.01); *G06V 10/00* (2022.01); *G06V 10/70* (2022.01); *G06V 10/88* (2022.01); *G06V 20/695* (2022.01); *G01N 2001/302* (2013.01); *G01N 2021/6439* (2013.01)

(58) Field of Classification Search
CPC ... G01N 2015/1006; G01N 2015/1472; G01N 2015/1488; G01N 2021/6439; G01N 21/6428; G01N 21/6458; G01N 33/5005; G06V 10/00; G06V 10/34; G06V 10/70; G06V 10/82; G06V 10/88; G06V 20/695; G06V 20/698
See application file for complete search history.

(56) References Cited

U.S. PATENT DOCUMENTS

| | | |
|---|---|---|
| 2012/0033064 A1 | 2/2012 | Yamada et al. |
| 2013/0023007 A1 | 1/2013 | Zahniser et al. |
| 2018/0260604 A1 | 9/2018 | McDonald |
| 2019/0383804 A1* | 12/2019 | Belhocine ............ G01N 33/532 |
| 2021/0033592 A1* | 2/2021 | Ye ...................... G01N 15/1434 |

FOREIGN PATENT DOCUMENTS

| | | | | |
|---|---|---|---|---|
| JP | S61172062 A | 8/1986 | | |
| JP | H03140864 A | 6/1991 | | |
| JP | 0548983 A1 * | 6/1993 | ............ | G01N 15/12 |
| JP | H1026620 A | 1/1998 | | |
| JP | 2003093100 A | 4/2003 | | |
| JP | 2009175334 A | 8/2009 | | |
| JP | 2012037432 A | 2/2012 | | |
| JP | 2014525040 A | 9/2014 | | |
| WO | WO-2020033871 A1 * | 2/2020 | ............ | C12M 23/20 |

OTHER PUBLICATIONS

International Council For Standardization In Haematology (ICSH); "Proposed reference method for reticulocyte counting based on the determination of the reticulocyte to red cell ratio"; Clin. Lab. Haem. 1998; 20, 77-79; 1998.

Riley, R. et al.; "Reticulocytes and Reticulocyte Enumeration"; Journal of Clinical Laboratory Analysis 15: 267-294 (2001); 2001.

Borrione, P. et al; "A biparametric flow cytometry analysis for the study of reticulocyte patterns of maturation"; Publication: Nov. 5, 2008; International Journal of Laboratory Hematology, 2010, 32, pp. 65-73; 2008.

Van Den Bossche, J. et al; "Reference intervals for a complete blood count determined on different automated Haematology analysers: Abx Pentra 120 Retic, Coulter Gen-S, Sysmex SE 9500, Abbott Cell Dyn 4000 and Bayer Advia 120"; Clin Chem Lab Med 2002; 40(1):69; 69-73; 2002.

Heimpel, H. et al; "Die Bestimmung der Retikulozytenzahl: Eine alte Methode gewinnt neue Bedeutung"; Medizinische Klinik, 2010; 105: 538-43 (Nr. 8); 2010.

* cited by examiner

MATURITY CLASSIFICATION OF STAINED RETICULOCYTES USING OPTICAL MICROSCOPY

CROSS REFERENCE TO RELATED APPLICATION

This claims priority to European Patent Application No. EP 20199526.3, filed Oct. 1, 2020, which is hereby incorporated by reference herein in its entirety for all purposes.

TECHNICAL FIELD

The present invention relates to a method of maturity classifying reticulocytes from a whole blood sample.

BACKGROUND

The monitoring of erythropoiesis is essential for determining a patient's health status and response to different treatments, for example, in iron-deficiency anaemia or in recovering from chemotherapy. In the process of erythropoiesis, when a late-stage erythroblast loses its nucleus, the developed cell is subsequently called a reticulocyte containing a filamentous RNA-network, the reticulum. Reticulocytes, obtained from peripheral blood, are easily accessible and indicate the reproduction rate of red blood cells (RBC) by determining cell count and maturation (Piva et al., 2015, Clinics in Laboratory Medicine, 35, 133-163). Two main methods for detecting reticulocytes are commonly used, agglutinating fluorescence staining or supravital staining of the reticulum. Both staining methods agglomerate the thin filamentous RNA strands to network-like filaments, which are observable through microscopy.

Although automated haematology analysers determine reticulocyte parameters more precisely, accurately, and reproducibly compared to manually counted cells in light microscopy, each analyser uses different reagents, which show a varying sensitivity on the binding to RNA and other cellular components. Therefore, across different staining methods no universal classification exists for determining maturity of reticulocytes (Van Den Bossche et al., 2002, Clin. Chem. Lab. Med., 40(1), 69-73). An approach to unify classifications was undertaken by determining the immature reticulocyte fraction (IRF) for fluorescence methods. The IRF is the fraction of the number of the less mature reticulocytes compared to the whole number of reticulocytes (Heimpel et al., 2010, Med. Klin., 105, 538-543). However, as no consensus is found for each class, the IRF also varies between different analysers (Riley et al., 2001, J. Clin. Labor. Anal., 15, 267-294). A different classification approach is based on the work of Ludwig Heilmeyer in the 1930s, which defines 4 maturation classes including immature reticulocytes with dense reticulum (class 1), reticulocytes with extensive but loose reticular network (class 2), reticulocytes with scattered reticulum network (class 3) and mature reticulocytes with scattered reticulum granules (class 4) (Riley et al., 2001, J. Clin. Labor. Anal., 15, 267-294).

Due to the difference between different automated haematology analysers, manual counting in light microscopy is still the gold standard for the diagnostic determination of reticulocyte maturation classes. There is also an increasing interest in devices determining all parameters for a complete blood count optically analogous to light microscopy.

There is hence a need for a standard metric to analyse stained reticulocytes that can be connected to a manual and, in particular, an automated microscope analysis, as well as a derived diagnostic detection.

SUMMARY

The present invention addresses this need and provides a method of maturity classifying reticulocytes from a whole blood sample, comprising: (a) staining the sample with a supravital agglutinating dyeing reagent or a fluorescent agglutinating dye; (b) illuminating the stained sample with a light beam, preferably of a wavelength range of 200 nm to 780 nm in a light detection device, preferably a microscope, to detect reticulocytes; (c) determining for each reticulocyte the parameters of (i) a fraction ($\Lambda$) of the reticulum area (Ar) to the whole cell area (Ac); and (ii) a fraction ($\Gamma$) of the perimeter of the reticulum (Ur) to the reticulum area (Ar); and (d) maturity classifying a reticulocyte into 1 of 4 major maturity classes according to the values determined for $\Lambda$ and $\Gamma$. The method advantageously allows to classify reticulocytes in accordance with a standard metric, which is largely independent of the platform or device used and thus allows for a uniform apportionment of reticulocytes in accordance with the well-established Heilmeyer classification scheme which is familiar to most practitioners. The new methodology according to the present invention further allows for an improved diagnostic readout on the basis of time-dependent changes in the number of reticulocytes after a treatment or during the course of a disease.

In a preferred embodiment of the present invention, the method additionally comprises as final step a step of enumerating the reticulocytes. It is particularly preferred that the enumeration is per class and per sample.

In a further preferred embodiment, the staining is performed with a supravital agglutinating dyeing reagent which is selected from NMB (new methylene blue), Brilliant cresyl blue, Crystal violet, Methyl violet, and Nile blue. In yet another preferred embodiment the staining is performed with an agglutinating fluorescent dye selected from Acridine orange, Auramine O, D-methyloxacarbocyanide, Ethidine bromide, Pyronin Y, Thioflavin-T, and Thiazole orange.

The staining may optionally further comprise a step of chemical nucleic acid crosslinking, preferably with a nitrogen mustard, a cis-diamminedichloroplatinum (II) or derivative, or chloroethyl nitroso urea (CENU).

In another embodiment, step (c) as mentioned above is performed with a device comprising an imaging module. It is preferred that the imaging module is designed to perform morphological segmentation operations.

A further embodiment relates to a method as defined above, which additionally comprises as step (f), a step of morphological comparison of each stained reticulocyte with an image repository of reticulocytes which have independently been classified by an expert. It is preferred that the classification leads to a tagging of reticulocytes for which the morphological classification differs from the classification of step (d).

In a preferred embodiment, the morphological comparison comprises applying an image of the stained reticulocyte to a machine-learning-based method, which was trained with images of the image repository of reticulocytes.

In an embodiment of the method according to the invention, the maturity classification comprises an assignment of reticulocytes to class 1, 2, 3, or 4 according to the ratio of $\Lambda/\Gamma$. In a preferred embodiment, a $\Lambda/\Gamma$ value of about >2.5 is indicative for class 1, a $\Lambda/\Gamma$ value of about 1 to about 2.5 is indicative for class 2, a Λ/Γ value of about 0.35 to about 1 is indicative for class 3, and a Λ/Γ value of about <0.35 is indicative for class 4.

In a further aspect, the present invention relates to a computer implemented method for maturity classifying reticulocytes from one or more images taken from a whole blood sample, comprising determining within an image for each reticulocyte the parameters of (i) a fraction (Λ) of the reticulum area (Ar) to whole cell area (Ac); and (ii) a fraction (Γ) of the perimeter of the reticulum (Ur) to the reticulum area (Ar); and maturity classifying the reticulocytes into 4 major classes according to values for Λ and Γ. The method preferably additionally comprises a step of enumerating the reticulocytes.

In another aspect, the present invention relates to an in vitro method for monitoring and determining a subject's health status and/or of a subject's reaction to a treatment, comprising the performance of the method of maturity classifying reticulocytes as defined above with one or more whole blood samples obtained from the subject.

In a preferred embodiment of the in vitro method for monitoring and determining a subject's health status and/or of a subject's reaction to a treatment, an increase in the numbers of reticulocytes of class 2, 3, or 4, preferably of class 3 or 4, more preferably of class 4, when an initial sample is compared with a second or further sample taken from the subject after a time period of 2, 3, 4, 5, 6, 7, or more days, is indicative for an amelioration of the subject's health and/or a positive response to the treatment in low reticulocyte diseases, or is indicative for an deterioration of the subject's health and/or a negative response to the treatment in high reticulocyte diseases.

In a further aspect, the present invention relates to a device comprising means for carrying out the method of maturity classifying reticulocytes as defined above or the in vitro method for monitoring and determining a subject's health status and/or of a subject's reaction to a treatment as defined above.

In another aspect, the present invention relates to a data processing device comprising means for carrying out the computer implemented method for maturity classifying reticulocytes from one or more images as defined above.

In a final aspect, the present invention relates to a computer program comprising instructions which, when the program is executed by a computer, cause the computer to carry out the method of maturity classifying reticulocytes comprising a morphological comparison step as defined above, or the computer implemented method as defined herein.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
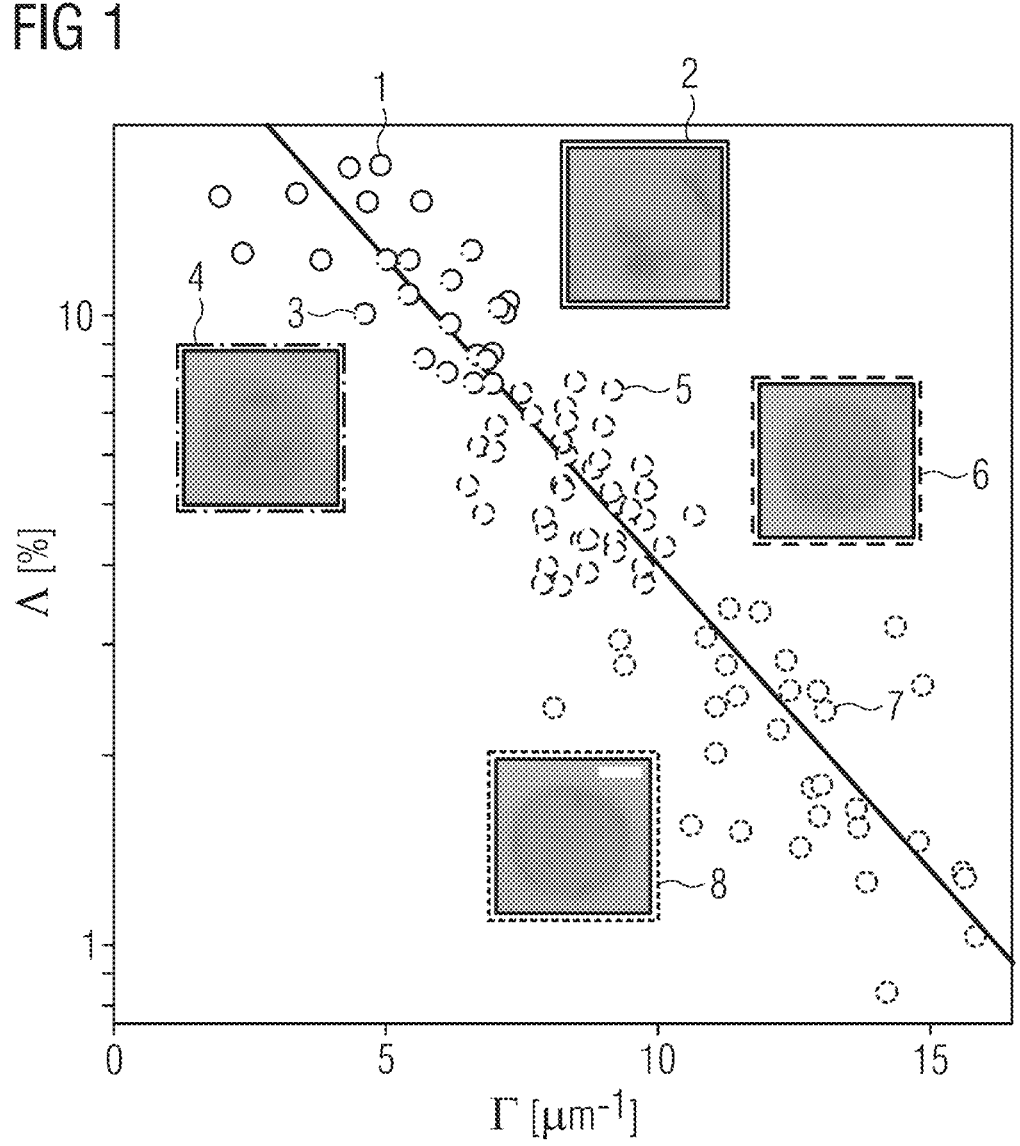
FIG. 1 shows quantitative maturation classification of reticulocytes recorded in bright field transmission mode according to the present invention. Classification is based on the percentage of stained reticulum area inside a cell compared to whole cell area (Λ) and based on the fraction of the perimeter of all RNA fragments to their areas (Γ). Four classes of reticulocytes as proposed by Heilmeyer are indicated. Class 1 (closed circles (1)) is the most immature class with an example cell shown in (2). Class 2 (open circles with dot (3)) corresponds to the second youngest group of reticulocytes (example cell shown in (4)), followed by Class 3 (open circles (5)) with an example cell (6), and Class 4 (dotted circles (7); example cell (8)) being the most mature group.

Although the present invention will be described with respect to particular embodiments, this description is not to be construed in a limiting sense.

Before describing in detail exemplary embodiments of the present invention, definitions important for understanding the present invention are given.

As used in this specification and in the appended claims, the singular forms of "a" and "an" also include the respective plurals unless the context clearly dictates otherwise.

In the context of the present invention, the term "about" denotes an interval of accuracy that a person skilled in the art will understand to still ensure the technical effect of the feature in question. The term typically indicates a deviation from the indicated numerical value of ±25%. In specific embodiments, the term may also indicate a deviation from the indicated numerical value by ±15%, ±10%, ±5%, ±3%, ±2%, ±1%, or ±0.5%.

It is to be understood that the term "comprising" is not limiting. For the purposes of the present invention, the term "consisting of" or "essentially consisting of" is considered to be a preferred embodiment of the term "comprising of." If hereinafter a group is defined to comprise at least a certain number of embodiments, this is meant to also encompass a group which preferably consists of these embodiments only.

Furthermore, the terms "(i)", "(ii)", "(iii)" or "(a)", "(b)", "(c)", "(d)", or "first", "second", "third," etc. and the like in the description or in the claims, are used for distinguishing between similar elements and not necessarily for describing a sequential or chronological order.

It is to be understood that the terms so used are interchangeable under appropriate circumstances and that the embodiments of the invention described herein are capable of operation in other sequences than described or illustrated herein. In case the terms relate to steps of a method, procedure, or use there is no time or time interval coherence between the steps, i.e., the steps may be carried out simultaneously or there may be time intervals of seconds, minutes, hours, days, weeks, etc. between such steps, unless otherwise indicated.

It is to be understood that this invention is not limited to the particular methodology, protocols, etc. described herein as these may vary. It is also to be understood that the terminology used herein is for the purpose of describing particular embodiments only and is not intended to limit the scope of the present invention that will be limited only by the appended claims.

The drawings are to be regarded as being schematic representations and elements illustrated in the drawings are not necessarily shown to scale. Rather, the various elements are represented such that their function and general purpose become apparent to a person skilled in the art.

Unless defined otherwise, all technical and scientific terms used herein have the same meanings as commonly understood by one of ordinary skill in the art.

As has been set out above, the present invention concerns in one aspect a method of maturity classifying reticulocytes from a whole blood sample, comprising: (a) staining the sample with a supravital agglutinating dyeing reagent or a fluorescent agglutinating dye; (b) illuminating the stained sample with a light beam, preferably of a wavelength range of 200 nm to 780 nm in a light detection device, preferably a microscope, to detect reticulocytes; (c) determining for each reticulocyte the parameters of (i) a fraction ($\Lambda$) of the reticulum area (Ar) to the whole cell area (Ac); and (ii) a fraction ($\Gamma$) of the perimeter of the reticulum (Ur) to the reticulum area (Ar); and (d) maturity classifying a reticulocyte into 1 of 4 major maturity classes according to the values determined for $\Lambda$ and $\Gamma$.

The term "whole blood sample" as used herein relates to a mammalian, preferably human blood sample, obtained via suitable methods known to the person skilled in the art from a subject. The sample used in the context of the present invention should preferably be collected in a clinically acceptable manner, more preferably in a way that nucleic acids, in particular RNA, are preserved. "Whole blood" comprises essentially red blood cells and precursor cells, white blood cells and precursor cells, as well as platelets suspended in plasma. In certain specific embodiments, samples may be pooled.

The present invention preferably envisages the use of non-pooled samples. In a specific embodiment of the present invention, the content of whole blood sample may also be submitted to specific processing steps. For example, the sample may be diluted or enriched. Furthermore, nucleic acid stabilizing or anti-degradation agents may be added. In particularly preferred embodiments, the use of anticoagulants such as EDTA is envisaged. In further specific embodiments, the whole blood sample may be subjected to an initial cell sorting or cell separation step before the staining. Such a step is envisaged to lead to an enrichment and/or purification of red blood cells (including precursor cells such as reticulocytes), or an enrichment and/or purification of reticulocytes.

The method according to the invention envisages as a first step a "staining" step with a whole blood sample as defined above. This step may be performed with any suitable dyeing agent, which is capable of showing the area and perimeter of a reticulum. Accordingly, the dyeing agent is capable of at least partially stabilizing nucleic acid structures, in particular, RNA structures with a cell, and of displaying these structures under suitable optical conditions, preferably when illuminated with light. The term "reticulum" as used herein refers to a mesh-like network of nucleic acids, in particular RNA, typically ribosomal RNA which becomes visible under staining conditions. The reticulum is specific structure which distinguishes reticulocytes from other blood cells. A "reticulocyte" as used herein relates to an immature red blood cell which does not have a cell nucleus. During erythropoiesis reticulocytes develop and mature in the bone marrow and then circulate for about a day in the blood stream before developing into mature red blood cells. In a healthy subject, the fraction of reticulocytes in the blood is typically about 0.5% to 2.5% in adults and about 2% to 6% in infants. The number of reticulocytes in a whole blood sample is typically used as indicator of bone marrow activity since it represents recent erythropoiesis events.

Due to the presence of nucleic acid forms in the reticulum, which allows to distinguish reticulocytes from mature red blood cells and other cells, the staining is preferably performed with dyeing agents which provide an agglutinating effect and allow for a suitable contrasting in optical detection procedures. Such staining approaches are, in preferred embodiments of the present invention, based on agglutinating dyeing reagents.

The term "agglutinating dyeing reagent" as used herein refers to a dyeing agent, which is assumed to bind to nucleic acid comprising structures within the cell, in particular, ribosomes and to cause them to clump. The present invention envisages in a preferred embodiment the use of all suitable agglutinating dyeing reagents having this function or capability.

In a preferred set of embodiments, the agglutinating dyeing reagent is a supravital agglutinating dyeing agent. The "supravital" dyes are typically employed for the staining of living cells that have been removed from an organism. Preferred examples of supravital agglutinating dyeing agents include NMB (new methylene blue), Brilliant cresyl blue, Crystal violet, Methyl violet, and Nile blue. Further envisaged is the use of any suitable derivative or functional equivalent thereof. Also envisaged is the use of Azure B or any suitable derivative thereof. The present invention further envisages the use of supravital agglutinating dyeing reagents which may not yet have been developed and fulfil the above-mentioned function. Particularly preferred is the employment of NMB (new methylene blue). Further information may be derived from suitable literature resources such as, for example, Samuel M. Rapoport, 2019, The reticulocyte, $1^{st}$ ed., CRC Press.

In a further preferred set of embodiments, the agglutinating dyeing reagent is a fluorescent agglutinating dyeing agent. Such a dye also interacts with nucleic acid containing structures, in particular ribosomes, and provides a fluorescent effect upon exposure to suitable excitation light. Examples of such dyeing reagents include Acridine orange, Auramine O, D-methyloxacarbocyanide, Ethidine bromide, Pyronin Y, Thioflavin-T, and Thiazole orange. Further envisaged is the use of any suitable derivative or functional equivalent thereof. The present invention further envisages the use of fluorescent agglutinating dyeing reagents which may not yet have been developed and fulfil the above-mentioned function. Further information may be derived from suitable literature resources such as, for example, Samuel M. Rapoport, 2019, The reticulocyte, $1^{st}$ ed., CRC Press.

The staining may be performed in line with a suitable procedure as known to the skilled person. In certain embodiments, the staining is performed in accordance with the procedure suggested by the manufacturer of the dyeing reagent. For example, a typical staining procedure may encompass the addition of the dyeing reagent, e.g., in concentration of about 1% to a mixture of the whole blood sample as defined herein and optionally a buffer, e.g., PBS. Subsequently, the mixture is incubated for a certain period, e.g., for 1 min, 2 min, etc. The incubation time may be adapted to the dye to be used. For example, for a staining approach using fluorescent dyes, the incubation time may be extended for several minutes, preferably according to the manufacturer's indication.

For subsequent analysis, stained samples may be provided in any suitable form. The samples may, for example, be analysed in liquid or solution, e.g., directly after staining. Alternatively, the samples may be stored for some time until the analysis. For such storing, the stained sample may, for example, be covered by a cover slide or may be mounted with aqueous or non-aqueous mounting media. If a mounting medium is used, the sample may optionally be covered with a cover glass, in particular if the samples need to be stored for a long period of time. This approach typically allows for stable preservation and virtually permanent storage of the sample. Examples of suitable aqueous mounting media include aquatex, gelatin, glycerol, Kaiser's glycerol gelatin, and sorbitol F liquid E420. Suitable examples of non-aqueous mounting media include DPX, entellan rapid mounting medium, M-Glas liquid cover glass, and neomount anhydrous mounting medium. In additional embodiments, the cells may be fixated with any suitable fixation method and reagent. For example, glutaraldehyde may be used.

Further information may be derived from suitable literature sources such as document H44-A2 of the clinical and laboratory standards institute on "Methods for Reticulocyte Counting (Automated Blood Cell Counters, Flow Cytometry, and Supravital Dyes); Approved Guideline—Second Edition" or any further edition.

Subsequent to the staining and optional storage, the mixture may be placed on a suitable carrier for subsequent analysis steps, or may be analysed in situ, or may be transferred to an analysis device. Alternatively, the staining may be performed in the same analysis device in which the subsequent analysis is performed.

In a very specific embodiment, the staining procedure according to the present invention may be accompanied or be antedated by a separate nucleic acid crosslinking. Such crosslinking may, for example, be performed with any suitable crosslinking reagent known to the skilled person. Examples of such reagents include nitrogen mustards, i.e., alkylating agents with a bis-(2-ethylchloro)amine core structure with a variable R-group, such as cyclophosphamide, chlorambucil, uramustine, melphalan, or bendamustine. Further examples include cis-diamminedichloroplatinum (II), i.e., cisplatin, which is capable of forming intra- or interstrand crosslinks. Further envisaged are variants or derivatives of cisplatin. Another example is chloroethyl nitroso urea (CENU), in particular carmustine (BCNU). Also envisaged are further crosslinkers such as psoralenes or mitmycine C. The use of a crosslinking step may be followed by a staining step or may be performed at the same time. In further embodiments, the use of a crosslinking reagent may also be combined with staining with a non-agglutinating dye, e.g., a non-agglutinating supravital dye or a non-agglutinating fluorescent dye.

Subsequent to the staining step, the stained sample is illuminated. The illumination is performed with a light beam in a light detection device. It is envisaged that light in the range of 200 nm to 780 nm is used. The wavelength of the light may be adapted to one or more factors, e.g., the nature of the dye and its excitation wavelength, the form of the light detection device, and its functional spectrum. The term "light detection device" as used herein relates to any optical system which is capable to detect and visualize light reflected from the sample, in particular cells in the sample such as reticulocytes. The light detection system is, in preferred embodiments, a microscope or microscope system which is capable of visualizing and/or fluorescently characterizing cells. It may comprise a light source or be connected to a light source, which can either be a laser or a light source for visual detection. The laser may, in particular, be a laser which allows to stimulate fluorescent dyeing reagent, preferably fluorescent dyeing reagents as mentioned herein. The microscope system may thus be a system capable of fluorescence microscopy. The microscope system may receive from the sample, e.g., a cell to be analysed, a form of visual reflection and/or a fluorescent reaction to the stimulation. The microscope may further comprise elements known to the skilled person such as, for example, focussing optical elements which can be designed as lenses and/or diaphragms. The microscope system may further be connected to an evaluation module, an imaging capture module, an AI module or neuronal network, a computer system, computer network or interface, database, image repository, or laboratory or hospital system. In specific embodiments, the microscope system may comprise or essentially be built upon a flow cytometer or a flow cytometry function comprising the system, in particular when fluorescent dyes are used. Examples of flow cytometry systems envisaged by the present invention include Siemens ADVIA 2120i, Sysmex XN-series, Sysmex XE-series, Abbott Diagnostics Cell-DYN Sapphire, and Beckman Coulter HmX. It is particularly preferred to use the Siemens ADVIA 2120i system. These systems may, in further embodiments, be combined with other systems or components or units of other systems, or individual additional components or units.

Upon illumination of the stained samples within a reticulocyte, a reticulum or reticular network structure becomes detectable. This structure may have different forms, area sizes, perimeters, and a different optical density, which depends on the developmental status of the reticulocyte. Typically, the reticulocyte may be classified according to the following 4 classes (Heilmeyer): class 1=immature reticulocytes with dense reticulum, class 2=reticulocytes with extensive but loose reticular network, class 3=reticulocytes with scattered reticulum network, and class 4=mature reticulocytes with scattered reticulum granules. Examples of class 1 to 4 according to Heilmeyer are provided in FIG. 1.

In a further central step of the method of the present invention, for each reticulocyte, parameters are determined which allow for a metric, non-biased decision of the class and thus developmental status of the recticulocyte. These parameters are a fraction ($\Lambda$) of the reticulum area (Ar) to the whole cell area (Ac) and a fraction ($\Gamma$) of the perimeter of the reticulum (Ur) to the reticulum area (Ar).

The fraction ($\Lambda$) of the fraction of the reticulum area (Ar) to the whole cell area (Ac) may be determined as $$\Lambda = \frac{\sum_i A_{r,i}}{A_c}$$

wherein Ar,i is the area of all individual stained nucleic acid areas, i.e., of all individual parts of the reticulum or reticular network within one reticulocyte; and wherein Ac is the area of the whole reticulocyte in which the area Ar,i was measured and in which the fraction $\Gamma$ was measured.

The fraction (Γ) of the perimeter of the reticulum (Ur) to the reticulum area (Ar) area may be determined as $$\Gamma = \frac{\sum_i U_{r,i}}{\sum_i A_{r,i}}$$

wherein Ur,i is the perimeter of all individual stained nucleic acid areas, i.e., of all individual parts of the reticulum or reticular network within one reticulocyte; and wherein Ar,i is the area of all individual stained nucleic acid areas, i.e., of all individual parts of the reticulum or reticular network within the reticulocyte in which the Ur,i was measured and in which the fraction Λ was determined.

Correspondingly obtained values are saved, e.g., in a computer system and/or evaluation module and/or database, etc., for subsequent comparison or evaluation processes.

Typically, reticulum parts or parts of the reticular network which are smaller than about 200 nm may not be detectable in the context of the present invention, in particular, when using microscope techniques as described herein. Accordingly, a limit for the detectability of reticulum areas may be set at about 0.15 µm².

In a subsequent step, the reticulocyte is maturity classified into 1 to 4 major maturity classes. This classification is performed according to the values determined for Λ and Γ as defined above.

Advantageously, the calculation of the perimeter of all nucleic acid fragments, in particular, RNA fragments, Ur and the division by the reticulum area Ar is allowed to significantly increase the accuracy of the classification of reticulocytes into classes 1 to 4 as defined above. Further, the use of the perimeter within the formula, i.e., for the maturity classification, advantageously allowed to distinguish between cells, which had less particles with larger reticulum areas compared to cells, which had more particles with smaller areas. This novel approach, thus, for the first time provides a suitable metric which translates the morphological observations by Heilmeyer into an automatable algorithm allowing for a very accurate reticulocyte maturity classification. The present invention thus provides a quantitative analysis approach, whereas morphological approaches are qualitative and hence convey a strong subjective bias, hence diminishing their comparability.

Figure 3:
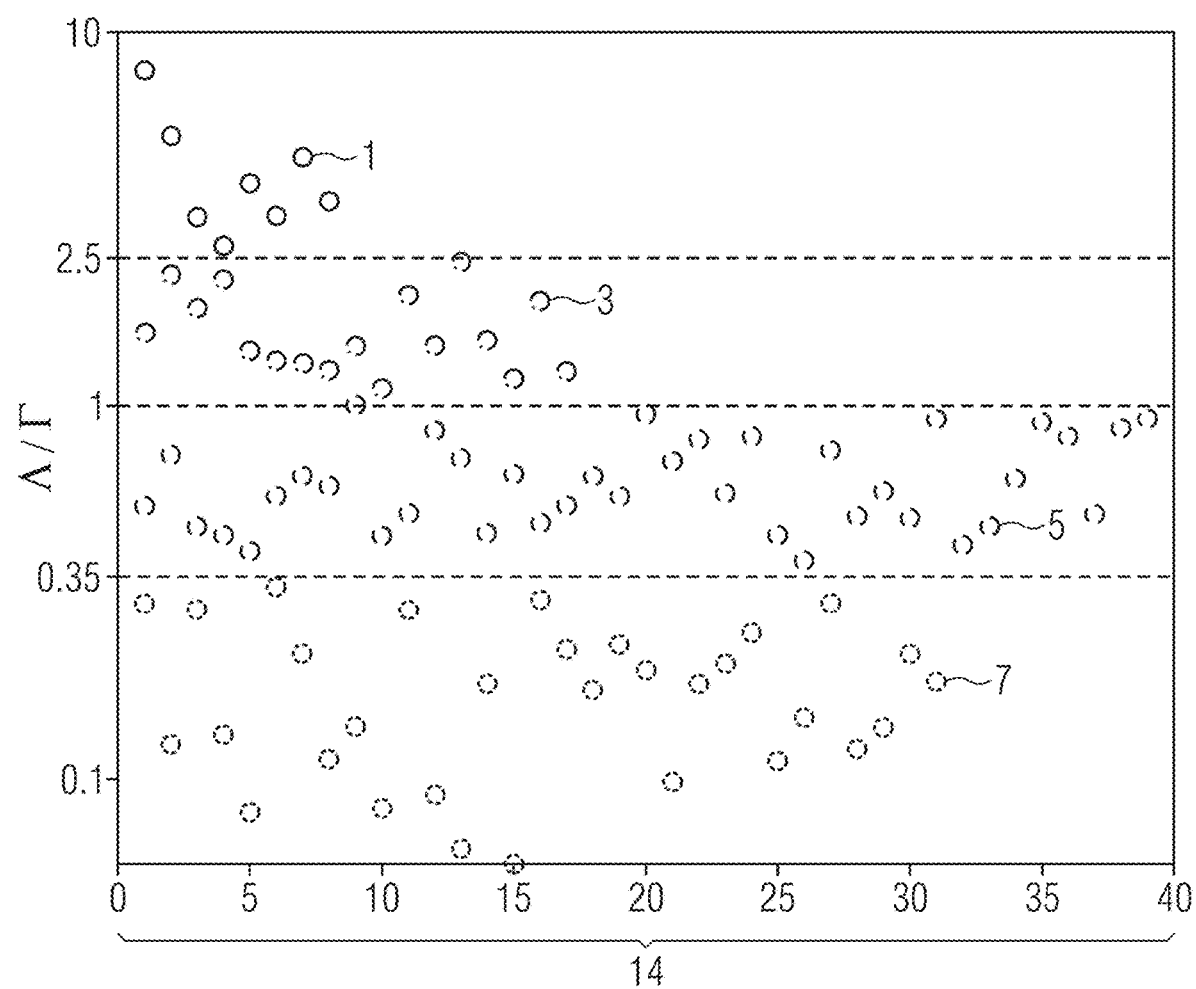
FIG. 3 shows a different depiction of the quantitative maturation classification of reticulocytes recorded in bright field transmission mode of the present invention shown in FIG. 1. In this figure, the Λ/Γ ratio is shown in comparison to the number of cells (14). The figures show Class 1 (closed circles (1)), Class 2 (open circles with dot (3)), Class 3 (open circles (5)), and Class 4 (dotted circles (7)) cells according to the Heilmeyer scheme.

In a particularly preferred embodiment, the maturity classification of the reticulocytes is based on the usage of the Λ/Γ value. This ratio combines both fraction values and allows for suitable translation into distinctive values, as can be derived from FIG. 3. Accordingly, the maturity classification comprises an assignment of reticulocytes to class 1, 2, 3 or 4 of Heilmeyer according to the ratio of Λ/Γ.

The Λ/Γ ratio may have different values which are influenced by several factors such as the light detection system used, the staining protocol used, the quality and age of the examined cells, potential pre-treatment steps, etc. Such differences may be compensated with a suitable calibration approach as known to the skilled person. The calibration may, for example, include the use of a predefined number of reticulocytes, standard staining conditions for the analysis in different light detection systems, etc. In certain embodiments commercially available calibration solutions may be used for calibration and referencing purposes. Examples of correspondingly envisaged calibration solutions are Cal-Chex, Cal-Chex A Plus, or Retic-Chex, etc. manufactured by Streck, Inc.

In a more preferred embodiment, the Λ/Γ ratio may be used to classify the reticulocytes in accordance with the following values:

A Λ/Γ ratio of about >2.5 is indicative for class 1 reticulocytes, i.e., for immature reticulocytes with a dense reticulum. The value of about 2.5 thus constitutes a boundary value between class 1 and class 2, which shows a Λ/Γ ratio below about 2.5.

A Λ/Γ value of about 1 to about 2.5 is indicative for class 2 reticulocytes, i.e., for reticulocytes with extensive but loose reticular network. The value of about 1 thus constitutes a boundary value between class 2 and class 3, which shows a Λ/Γ ratio below about 1.

A Λ/Γ value of about 0.35 to about 1 is indicative for class 3 reticulocytes, i.e., for reticulocytes with scattered reticulum network. The value of about 0.35 thus constitutes a boundary value between class 3 and class 4, which shows a Λ/Γ ratio below about 0.35.

A Λ/Γ value of about <0.35 is indicative for class 4 reticulocytes, i.e., for reticulocytes mature reticulocytes with scattered reticulum granules.

The indicated boundary value may slightly change by a tolerance factor of ±25%, preferably by a tolerance factor of +15%, ±10%, more preferably by tolerance factor of ±5%, +3%, ±2%, ±1%, or ±0.5% due to optical measurement tolerances, e.g., for different analytic equipment, or due to staining differences, or due to differences in reticulum or cell segmentations based on different programs or algorithms, etc.

The present invention further envisages the provision of boundary classes between classes 1 and 2; 2 and 3; 3 and 4. These boundaries may comprise reticulocytes for which classification into classes 1 or 2; 2 or 3; or 3 or 4 is not possible or ambiguous, e.g., due to Λ/Γ value corresponding to the boundary values mentioned. The boundary classes may further be established on the basis of the application of a tolerance factor as mentioned above on the class definition provided above. It is further envisaged that a rejoining of boundary classes with class 1 to 4 may be performed with the help of a suitable calibration factor, e.g., after calibration or comparison experiments and calculations taking into account optical and chemical differences in reticulocyte staining and detection. Further information may be derived from suitable literature sources such as Samuel M. Rapoport, 2019, The reticulocyte, 1$^{st}$ ed., CRC Press.

The present invention further relates to a method which comprises a step of enumerating the reticulocytes. The term "enumerating" as used herein means to count and sum the number of reticulocytes per defined area, volume, time period, or other suitable unit, preferably per defined volume, e.g., sample volume. In certain embodiments, the enumeration may be performed per class of reticulocytes as defined herein. For example, all reticulocytes in class 1, 2, 3, and/or 4 of a sample may be counted. In further specific embodiments, the enumeration may further include a counting a non-reticulocytes in the sample, preferably of erythrocytes. The corresponding number may further be compared with the reticulocyte number, the number of reticulocytes in class 1, 2, 3, or 4 and/or previous counting results, e.g., of the same subject, a different sample of the same subject, a reference value from a database, a calibration reference as mentioned herein, a reference value from a textbook or other literature source, a reference value from an independently determined healthy or sick subject, etc. An example of a suitable online source which provides additional details may further be found at https://apps.who.int/iris/handle/10665/61756 (last visited on Sep. 28, 2020).

In a further particularly preferred embodiment, the present invention envisages a method as defined above, wherein step (c), i.e., the determination for each reticulocyte of the parameters of (i) a fraction (Λ) of the reticulum area (Ar) to the whole cell area (Ac); and (ii) a fraction (Γ) of the perimeter of the reticulum (Ur) to the reticulum area (Ar) area, is performed with a device comprising an imaging module.

The term "imaging module" as used herein refers to a unit which is capable of performing image processing procedures. The present invention accordingly envisages acquiring images of reticulocytes or other cellular components present in a sample as described herein, preferably of stained reticulocytes present in a sample as described herein. This image acquisition may further include preprocessing or scaling activities.

In addition, the present invention specifically envisages an image processing of the acquired images. The term "image processing" as used herein relates to general methods to convert an image into a digital form and to perform operations on it in order to enhance the image and/or to extract useful or desired information. The output of the image processing may be a modified image or characteristics or values associated with the image.

Imaging modules according to the present invention are designed to be capable of image processing, in some embodiments, together with other modules, programs, databases, image repository or networks, etc.

Image processing may comprise one or more of the following activities, functions, or procedures: image enhancement including brightness or contrast adjustment; wavelets and multiresolution processing including image subdividing and pyramidal representation; compression activities including techniques for reducing the storage required to save an image or the bandwidth to transmit it; morphological processing including the extraction of image components required for representation or description of shape, area information, or perimeter information of a cell or cellular component; segmentation, i.e., a partition of an image into its constituent parts or objects; representation of data provided in the segmentation step; description, i.e., extracting attributes from segmented data, including the provision of quantitative data allowing the differentiation of one class of objects from another; and/or object recognition, i.e., the assignment of labels to objects based on its description. These activities, functions, or procedures may preferably be performed in an automatic or programmed manner, e.g., based on the use of suitable computer programs or AI modules. It is particularly preferred that the imaging module is designed to perform morphological segmentation operations, i.e., the extraction of image components and their partition into constituent parts or objects, e.g., reticulum structures, reticular network structures, cell perimeters, cell areas, reticulum areas, reticulum perimeters, staining intensities within the reticulum, differences in staining intensities within the reticulum, etc.

In a further preferred embodiment of the present invention, the method as described above comprises as an additional step, a step (f) which comprises a morphological comparison of each stained reticulocyte with an image repository of reticulocytes which have independently been classified by an expert. The term "morphological comparison" as used herein relates to a matching and contrasting activity with respect to one or more of the features of structure, shape, form, size, presence of pattern, optical/visual representation, contrast, color, or staining density, etc. associated with a cell, in particular with a reticulocyte present in a sample, or more preferably a sub-cellular part, e.g., a reticulum or reticular network. The comparison comprises a matching and contrasting of images, preferably images which have been processed in an imaging module as described herein, with images or data that have previously or alternatively been classified into class 1 to 4 according to Heilmeyer by an expert and which have been stored together with the classification information in an image repository. These stored images may further have undergone an image processing similar or identical to the image processing performed with the images of reticulocytes obtained according to the method of the present invention.

It is particularly preferred that the morphological comparison comprises the application of an image of the stained reticulocyte to a machine-learning-based method. The concept of "machine-learning" as used within the context of the present invention typically relies on a two-step approach: first, a training phase; and second, a prediction phase. In the training phase, values of one or more parameters of the machine-learning model (MLM) are set using training techniques and training data. In the prediction phase, the trained MLM operates on measurement data. Example parameters of an MLM include: weights of neurons in a given layer of an artificial neural network (ANN) such as a convolutional neural network (CNN); kernel values of a kernel of a classifier, etc.

Building an MLM can include the training phase to determine the values of the parameters. It is particularly preferred that the training is performed with images of an image repository of reticulocytes. As mentioned above, the images of the repository have advantageously independently been classified by an expert. The expert may, for example, be a histologist or hematologist. The expert may, in further embodiments, also be a group of experts which adjust or harmonize their subjective classification. Corresponding results, i.e., labelling of reticulocyte images to class 1, 2, 3, or 4, are subsequently stored in the image repository, e.g., together with the image. This information can be retrieved and used by the MLM as a training set.

Building an MLM can generally also include determining values of one or more hyperparameters. Typically, the values of one or more hyperparameters of the MLM are set and not altered during the training phase. Hence, the value of the hyperparameter can be altered in outer-loop iterations; while the value of the parameter of the MLM can be altered in inner-loop iterations. Sometimes, there can be multiple training phases, so that multiple values of the one or more hyperparameters can be tested or even optimized. The performance and accuracy of most MLMs are strongly dependent on the values of the hyperparameters.

Example hyperparameters include: number of layers in a convolutional neural network; kernel size of a classifier kernel; input neurons of an ANN; output neurons of an ANN; number of neurons per layer; learning rate, etc.

Various types and kinds of MLMs can be used in the context of the present invention. For example, a novelty detector MLM/anomaly detector MLM, or a classifier MLM may be employed, e.g., a binary classifier. For example, a deep-learning (DL) MLM can be employed: here, features detected by the DL MLM may not be predefined, but rather may be set by the values of respective parameters of the model that can be learned during training.

To build the MLM, several techniques may be used. For example, the type of the training may vary with the MLM type. Further, the type of the employed training may vary in different implementations. For example, an iterative optimization could be used that uses an optimization function that is defined with respect to one or more error signals.

The outcome of the morphological comparison operation for each stained reticulocyte as described above is then compared with the classification result according to the Λ and Γ metric approach according to the invention as defined above. In case both classification approaches coincide, no specific tagging or alert or remark is necessary. The consistency may, in certain embodiments, be stored as "metric classification confirmed by morphology" or the like. In case of a non-consistency between the outcome of the Λ and Γ metric approach and the morphological approach, a tag is attached to the image (e.g., live or stored image) of the reticulocyte for which a difference was detected. This tagging may further lead to an alert or message to an operator to further analyse the obtained result. Alternatively, a rerun of both the metric and the morphological analysis may be initiated to confirm the result. The tagging may further comprise an internal classification according to the measured differences. For example, in case the Heilmeyer class as defined via the metric approach differs by 1 from the class as defined by the morphological approach, e.g., metrically defined class=2, morphologically defined class=1, or vice versa, etc., an internal value of 1 (=degree of difference) is attached to the tag. In case the Heilmeyer class as defined via the metric approach differs by more than 1, e.g., 2, from the class as defined by the morphological approach, e.g., metrically defined class=3, morphologically defined class=1, or vice versa, an internal value of 2 (=degree of difference) is attached to the tag. Further analysis and/or control operations, which may also include checking of the equipment, optical devices, image repository, etc., may be performed in accordance with the degree of difference.

For diverging classifications which have a degree of difference of 1, the present invention envisages in a specific group of embodiments a selection of the metrically obtained results. For diverging classifications which have a degree of difference of 2, the present invention envisages in a specific group of embodiments a selection of a classification which is in between the metrically and morphologically defined classes. The present invention further envisages for diverging classifications a tagging of the sample comprising the divergent results and an independent analysis of the sample, or a further, e.g., parallel, sample of the same subject with a different analysis or preparation method, e.g., based on blood smear.

In a further aspect, the present invention relates to a computer implemented method for maturity classifying reticulocytes from one or more images taken from a whole blood sample as defined above. The method comprises determining within an image for each reticulocyte the parameters of (i) a fraction (Λ) of the reticulum area (Ar) to whole cell area (Ac); and (ii) a fraction (Γ) of the perimeter of the reticulum (Ur) to the reticulum area (Ar); and maturity classifying the reticulocytes into 4 major classes according to values for Λ and Γ. The method further, in some embodiments, includes a step of enumerating the reticulocytes, preferably as defined herein above. The method comprises image acquisition and image processing steps as defined herein above. In certain embodiments, also morphological comparison images with an image repository of reticulocytes as defined herein above may be implemented and performed. The method may be implemented on any suitable storage or computer platform, e.g., be cloud-based, internet-based, intra-net based, or present on local computer or cellphones, etc.

In a further aspect, the present invention relates to a data processing device comprising means for carrying out the computer implemented method as defined above. The device comprises means for carrying out any one or more steps of the computer implemented method of the present invention as mentioned herein above. Accordingly, any of the computer-implemented methods described herein may be totally or partially performed with a computer system including one or more processor(s), which can be configured to perform the steps. Accordingly, some of the present embodiments are directed to computer systems configured to perform the steps of any of the computer-implemented methods described herein, potentially with different components performing respective steps or a respective group of steps. Corresponding steps of methods may further be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

Also envisaged is a computer program comprising instructions which, when the program is executed by a computer, cause the computer to carry out any of the computer implemented methods of the invention as defined herein or any one or more computerizable steps of the methods of the present invention as mentioned herein.

Also envisaged is the provision of a computer-readable storage medium comprising a computer program product as defined above. The computer-readable storage medium may be connected to a server element, or be present in a cloud structure, or be connected via internet or intranet to one or more database structures, or client databases, etc.

Any of the software components or computer programs or functions described herein may be implemented as software code to be executed by a processor using any suitable computer language such as, for example, Java, Python, Javascript, VB.Net, C++, C#, C, Swift, Rust, Objective-C, Ruby, PHP, or Perl using, for example, conventional or object-oriented techniques. The software code may be stored as a series of instructions or commands on a computer readable medium for storage and/or transmission; suitable media include random access memory (RAM), a read only memory (ROM), a magnetic medium such as a hard-drive, or an optical medium such as a compact disk (CD) or DVD (digital versatile disk), flash memory, and the like. The computer readable medium may be any combination of such storage or transmission devices. Such programs may also be encoded and transmitted using carrier signals adapted for transmission via wired, optical, and/or wireless networks conforming to a variety of protocols, including the Internet. As such, a computer readable medium according to the present invention may be created using a data signal encoded with such programs. Computer readable media encoded with the program code may be packaged with a compatible device or provided separately from other devices (e.g., via internet download). Any such computer readable medium may reside on or within a single computer program product (e.g., a hard drive, a CD, or an entire computer system), and may be present on or within different computer program products within a system or network. A computer system may include a monitor, printer, or other suitable display for providing any of the results mentioned herein to a user.

In a further aspect, the present invention relates to an in vitro method for monitoring and determining a subject's health status and/or of a subject's reaction to a treatment.

This method comprises the performance of a method of maturity classifying reticulocytes from a whole blood sample of a subject as defined herein. It is particularly preferred that the methods include the step of enumeration of reticulocytes over the entire sample and/or per classes as defined herein. Subsequent to the performance of a classification of reticulocytes in the sample and optionally an enumeration, a comparison of the obtained results with one or more reference values or numbers may be performed. For example, the obtained numbers of reticulocytes per sample volume or per class per sample volume may be compared with numbers obtained from a normal or healthy subject. Further, they may be compared with numbers obtained from subjects having been diagnosed with specific diseases, e.g., a disease having an influence on erythropoiesis, blood cell cycling, or the number of blood cells in general, for instance, anemia or bone marrow disorders. In further embodiments, the numbers may be compared with reference numbers from databases, textbooks, literature sources, hospital documents, etc.

The term "health status" as used herein refers to the presence or absence of a disease in a subject, e.g., in comparison to a heathy individual. In certain embodiments, the term may further relate to a health development trend such as the deterioration or amelioration of a medical situation or disease situation.

In certain embodiments, the method for monitoring or determining a subject's health status may provide as a result an overall number of reticulocytes in a sample which is lower than the number of reticulocytes in a reference sample of a healthy subject, or which provides as a result a number of reticulocytes in class 1 which is lower than the number of reticulocytes in a reference sample of a healthy subject in the same class 1, whereas the other classes show similar numbers in the examined and the reference sample; or which provides as a result a number of reticulocytes in class 2 which is lower than the number of reticulocytes in a reference sample of a healthy subject in the same class 2, whereas the other classes show similar numbers in the examined and the reference sample; or which provides as a result a number of reticulocytes in class 3 which is lower than the number of reticulocytes in a reference sample of a healthy subject in the same class 3, whereas the other classes show similar numbers in the examined and the reference sample; or which provides as a result a number of reticulocytes in class 4 which is lower than the number of reticulocytes in a reference sample of a healthy subject in the same class 4, whereas the other classes show similar numbers in the examined and the reference sample; or which provides as a result a number of reticulocytes in class 1 and 2, or in class 2 and 3, or in class 3 and 4, or in class 1, 2, and 3, or in class 2, 3, and 4 which is lower than the number of reticulocytes in a reference sample of a healthy subject in the corresponding classes, whereas the other classes show similar numbers in the examined and the reference sample. These results may be considered as being indicative for bone marrow failure, e.g., due to drug, tumor, radiation therapy, or infection; cirrhosis of the liver; anemia, which may be caused by low iron levels, or low levels of vitamin B12 or folate; or chronic kidney disease. These diseases are understood as "low reticulocyte diseases" within the context of the present invention.

In certain embodiments, the method for monitoring or determining a subject's health status may provide as a result an overall number of reticulocytes in a sample which is higher than the number of reticulocytes in a reference sample of a healthy subject, or which provides as a result a number of reticulocytes in class 1 which is higher than the number of reticulocytes in a reference sample of a healthy subject in the same class 1, whereas the other classes show similar numbers in the examined and the reference sample; or which provides as a result a number of reticulocytes in class 2 which is higher than the number of reticulocytes in a reference sample of a healthy subject in the same class 2, whereas the other classes show similar numbers in the examined and the reference sample; or which provides as a result a number of reticulocytes in class 3 which is higher than the number of reticulocytes in a reference sample of a healthy subject in the same class 3, whereas the other classes show similar numbers in the examined and the reference sample; or which provides as a result a number of reticulocytes in class 4 which is higher than the number of reticulocytes in a reference sample of a healthy subject in the same class 4, whereas the other classes show similar numbers in the examined and the reference sample; or which provides as a result a number of reticulocytes in class 1 and 2, or in class 2 and 3, or in class 3 and 4, or in class 1, 2, and 3, or in class 2, 3, and 4 which is higher than the number of reticulocytes in a reference sample of a healthy subject in the corresponding classes, whereas the other classes show similar numbers in the examined and the reference sample. These results may be considered as being indicative for anemia, which may be due to red blood cells being destroyed earlier than normal (i.e., hemolytic anemia); bleeding; blood disorder in a fetus or newborn (erythroblastosis fetalis); or a kidney disease, with increased production of erythropoietin. These diseases are understood as "high reticulocyte diseases" within the context of the present invention.

The term "reaction to a treatment" as used herein refers to a positive or negative response of a subject to the treatment of a disease which may have an influence on the erythropoiesis or be connected with any of the above-mentioned diseases or further other diseases which are diagnosed on the same disorder.

The envisaged method for monitoring and determining a subject's health status and/or of a subject's reaction to a treatment comprises, in certain embodiments, the performance of the methods of the present invention with more than one sample taken from a subject. For example, a sample may be taken at an initial point in time and subsequently a further sample may be taken after a certain time period. The time period may be any time period considered suitable to the skilled person. The time period may be governed by the disease or treatment of the subject, its hospitalization status, the health status of the subject or any other factor of diagnostic relevance. In certain embodiments, the further sample is taken from the subject after a time period of 2, 3, 4, 5, 6, 7, or more days. Also envisaged are 10 days, 14 days, 3 weeks, 1 month, 2 months, 3 months, 4 months, 5 months, 6 months, or more.

The comparison of enumeration and classification procedures with samples taken from a subject at different times may provide as result a similar number and/or class distribution of reticulocytes, or an increased number of reticulocytes in general or within one or more classes, or a decreased number of reticulocytes in general or within one or more classes. The corresponding results may then be used for an attribution to a diagnostic conclusion.

For example, an increase in the numbers of reticulocytes in general or of class 2, 3, or 4 when an initial and subsequently taken sample are compared is indicative for an amelioration of the subject's health and/or a positive response to the treatment in case of a low reticulocyte disease such as bone marrow failure, e.g., due to drug, tumor, radiation therapy, or infection; cirrhosis of the liver; anemia, which may be caused by low iron levels, or low levels of vitamin B12 or folate; or chronic kidney disease.

Similarly, an increase in the numbers of reticulocytes in general or of class 2, 3, or 4 when an initial and subsequently taken sample are compared is indicative for a deterioration of the subject's health and/or a negative response to the treatment in case of a high reticulocyte disease such as hemolytic anemia; bleeding; blood disorder in a fetus or newborn (erythroblastosis fetalis); or a kidney disease, with increased production of erythropoietin.

In a further embodiment, a decrease in the numbers of reticulocytes in general or of class 2, 3, or 4 when an initial and subsequently taken sample are compared is indicative for an amelioration of the subject's health and/or a positive response to the treatment in case of a high reticulocyte disease such as hemolytic anemia; bleeding; blood disorder in a fetus or newborn (erythroblastosis fetalis); or a kidney disease, with increased production of erythropoietin.

In another embodiment, a decrease in the numbers of reticulocytes in general or of class 2, 3, or 4 when an initial and subsequently taken sample are compared is indicative for a deterioration of the subject's health and/or a negative response to the treatment in case of a low reticulocyte disease such as bone marrow failure, e.g., due to drug, tumor, radiation therapy, or infection; cirrhosis of the liver; anemia, which may be caused by low iron levels, or low levels of vitamin B12 or folate; or chronic kidney disease. Further details may be derived from suitable literature or internet sources such as, for example, https://www.statpearls.com/kb/viewarticle/28438 (last visited on Sep. 28, 2020).

In a further aspect, the present invention relates to a device comprising means for carrying out the method according to the invention. The device may accordingly comprise a module capable of performing staining activity as defined herein above. The staining module may comprise elements for cell preparation, cell sorting, cell purification, chemical treatment, staining, washing, etc., and optionally storing functions. This module may, for example, be composed of a robotic entity or function. The device may further comprise a module which is capable of illuminating the stained sample. This module may have the form of a microscope or microscopic system and may comprise focusing optical elements which can be designed as lenses and/or diaphragms. In specific embodiments, the microscope system may additionally comprise or essentially be built upon a flow cytometer or a flow cytometry function comprising system, in particular, when fluorescent dyes are used. The microscope module may further be connected to an evaluation module which is capable of determining within a reticulocyte the parameters $\Lambda$ and $\Gamma$ as described herein. This evaluation module may, for example, be implemented or connected to an imaging module as defined herein above, i.e., a unit which is capable of performing image processing procedures with acquired images of reticulocytes or other cellular components present in a sample as described herein, preferably of stained reticulocytes present in a sample as described herein. Also envisaged is the presence of a maturity classification module which is capable of attributing the measured values of parameters $\Lambda$ and $\Gamma$ of reticulocytes to classes 1 to 4 according to Heilmeyer. This module may, for example, be a computer-based module or an AI module or neuronal network, a computer system, computer network or interface, and may be optionally connected to a database, image repository, or laboratory or hospital system.

EXAMPLES

Example 1

Reticulocyte Detection

Materials and Methods for Reticulocyte Detection

Samples. Peripheral blood was drawn with informed consent and procedures approved by application 316_14B of the *Ethikkommission der Universität Erlangen* from healthy donors. The blood from each sample was collected in 4.7 ml EDTA-coated tubes. All samples were processed within 6 h of collection.

Determining unmatured erythrocytes was realized by using supravital dyes, which precipitate the cytoplasmic RNA into a reticulum-like network. We treated reticulocytes with a basic new methylene blue (NMB, c=0.5%, Sigma-Aldrich) dye. The dye solution was added for 1 min to whole blood. Generating a blood smear allowed the visualization of this filamentous network under a light microscope.

Optical configuration. Identification of reticulocytes was realized by recording bright field images in transmission mode through a 40× objective (HP PL APO 40×/0.95 CORR PH2, Leica) with a camera (Apex 3-CMOS prism-based RGB camera, JAI) installed on a DMi8 Leica inverted microscope.

Statistical analysis. Images were analysed by using ImageJ. Segmentation of the stained reticulum was achieved by transforming color images into RGB-grayscale images. The auto-thresholding algorithm was applied in the green channel to determine the area and perimeter of the reticulum.

Figure 2:
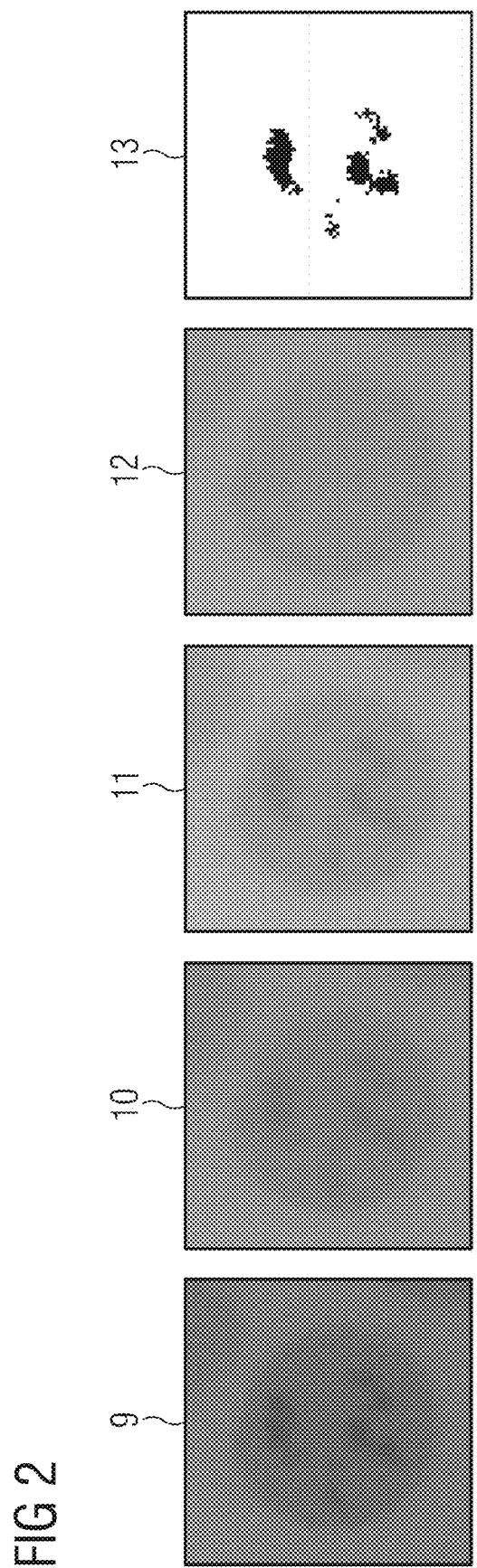
FIG. 2 shows an example of a bright field transmission colour (9) image split into separate RGB (R: red (10), G: green (11), B: blue (12)) 8-bit images of a stained reticulocyte. The size of the cell is determined by using the Otsu-threshold on the red channel. For an area determination of the reticulum, a mask of the stained RNA is generated by subtracting the green channel from the blue one, as the cell wall exclusively appears in the blue channel. Applying additionally the auto-threshold in ImageJ on the generated image, a mask of the stained reticulum is obtained (13).

The figures (FIG. 1, FIG. 2, FIG. 3) are provided for illustrative purposes. It is thus understood that the figures are not to be construed as limiting. The skilled person in the art will clearly be able to envisage further modifications of the principles laid out herein.

The invention claimed is:

1. A method of maturity classifying reticulocytes from a whole blood sample, comprising:
   (a) staining the sample with a supravital agglutinating dyeing reagent or a fluorescent agglutinating dye;
   (b) illuminating the stained sample with a light beam in a light detection device to detect reticulocytes;
   (c) determining within an image, via one or more modules executing software on a processor to at least perform morphological segmentation operations, for each reticulocyte parameters of (i) a fraction ($\Lambda$) of a reticulum area (Ar) to a whole cell area (Ac) and (ii) a fraction ($\Gamma$) of a perimeter of the reticulum (Ur) to the reticulum area (Ar), wherein the image for each reticulocyte is an RGB (red-green-blue)-grayscale image and the reticulum area (Ar) and perimeter (Ur) are determined by the one or more modules using the green channel;
   (d) maturity classifying, via the one or more modules, each reticulocyte into 1 of 4 major maturity classes according to values determined for A and T; and
   (e) determining a subject's health status or reaction to a treatment based on one or more numbers of reticulocytes classified in step (d) compared with one or more reference numbers of classified reticulocytes or the subject's previous one or more numbers of classified reticulocytes.

2. The method of claim 1, additionally comprising enumerating the reticulocytes, wherein enumeration is per class and per sample.

3. The method of claim 1, wherein the staining is performed with a supravital agglutinating dyeing reagent selected from NMB (new methylene blue), Brilliant cresyl blue, Crystal violet, Methyl violet, and Nile blue.

4. The method of claim 1, wherein the staining is performed with an agglutinating fluorescent dye selected from Acridine orange, Auramine O, D-methyloxacarbocyanide, Ethidine bromide, Pyronin Y, Thioflavin-T, and Thiazole orange.

5. The method of claim 1, wherein step (c) is performed with a device comprising an imaging module designed to perform morphological segmentation operations.

6. The method of claim 1 additionally comprising (e) (f) morphologically comparing each stained reticulocyte with an image repository of reticulocytes, wherein reticulocytes for which the morphologically comparing differs from the classification of step (d) are tagged.

7. The method of claim 6, wherein the morphologically comparing comprises applying an image of the stained reticulocyte to a machine-learning-based method, which was trained with images of the image repository of reticulocytes.

8. The method of claim 1, wherein the maturity classifying comprises assigning reticulocytes to class 1, 2, 3, or 4 according to the ratio of $\Lambda/\Gamma$.

9. The method of claim 8, wherein a $\Lambda/\Gamma$ value of about >2.5 is indicative for class 1, a $\Lambda/\Gamma$ value of about 1 to about 2.5 is indicative for class 2, a $\Lambda/\Gamma$ value of about 0.35 to about 1 is indicative for class 3 and a $\Lambda/\Gamma$ value of about <0.35 is indicative for class 4.

10. A computer implemented method for maturity classifying reticulocytes from one or more images taken from a whole blood sample, comprising:
    determining within an image, via one or more modules executing software on a processor to at least perform morphological segmentation operations, for each reticulocyte parameters of (i) a fraction ($\Lambda$) of a reticulum area (Ar) to a whole cell area (Ac) and (ii) a fraction ($\Gamma$) of a perimeter of the reticulum (Ur) to the reticulum area (Ar), wherein the image for each reticulocyte is an RGB (red-green-blue)-grayscale image and the reticulum area (Ar) and perimeter (Ur) are determined by the one or more modules using the green channel;
    maturity classifying, via the one or more modules, the reticulocytes into 4 major classes according to values for $\Lambda$ and $\Gamma$; and
    determining a subject's health status or reaction to a treatment based on one or more numbers of classified reticulocytes compared with one or more reference numbers of classified reticulocytes or the subject's previous one or more numbers of classified reticulocytes.

11. The method of claim 8, wherein an increase in the numbers of reticulocytes of class 2, 3, or 4, when an initial sample is compared with a second or further sample taken from a subject after a time period of 2 or more days, is indicative of an amelioration of a subject's health or a positive response to treatment in low reticulocyte diseases, or is indicative of a deterioration of the subject's health or a negative response to treatment in high reticulocyte diseases.

12. A computer program comprising instructions stored in a non-transitory computer readable medium which, when executed by a computer, cause the computer to:
    stain the sample with a supravital agglutinating dyeing reagent or a fluorescent agglutinating dye;
    illuminate the stained sample with a light beam in a light detection device to detect reticulocytes;
    determine within an image for each reticulocyte parameters of (i) a fraction ($\Lambda$) of a reticulum area (Ar) to a whole cell area (Ac), and (ii) a fraction ($\Gamma$) of a perimeter of the reticulum (Ur) to the reticulum area (Ar);
    maturity classify a reticulocyte into 1 of 4 major maturity classes according to the values determined for $\Lambda$ and $\Gamma$; and
    morphologically compare each stained reticulocyte with an image repository of reticulocytes to classify each stained reticulocyte into the 1 of 4 major maturity classes and tag for further analysis those stained reticulocytes having a different classification than a classification according to the values determined for $\Lambda$ and $\theta$.

13. The method of claim 1, wherein the light beam has a wavelength range of 200 nm to 780 nm, and the light detection device comprises a microscope.

14. The method of claim 1, wherein the staining further comprises chemical nucleic acid crosslinking.

15. The method of claim 14, wherein the chemical nucleic acid crosslinking is with a nitrogen mustard, a cis-diamminedichloroplatinum (II) or derivative, or chloro ethyl nitroso urea (CENU).

16. The computer implemented method of claim 10 further comprising enumerating the reticulocytes.

\* \* \* \* \*